United States Patent
Wilton et al.

(10) Patent No.: US 8,734,285 B2
(45) Date of Patent: May 27, 2014

(54) TRANSMISSION WITH DUAL CLUTCH ACTUATION ASSEMBLY

(75) Inventors: Daryl A. Wilton, Macomb, MI (US); James M. Hart, Belleville, MI (US)

(73) Assignee: GM Global Technology Operations, Detroit, MI (US)

( * ) Notice: Subject to any disclaimer, the term of this patent is extended or adjusted under 35 U.S.C. 154(b) by 0 days.

(21) Appl. No.: 13/585,536

(22) Filed: Aug. 14, 2012

(65) Prior Publication Data
US 2013/0053207 A1 Feb. 28, 2013

Related U.S. Application Data

(60) Provisional application No. 61/529,800, filed on Aug. 31, 2011.

(51) Int. Cl.
*F16H 3/62* (2006.01)

(52) U.S. Cl.
USPC .......................................... 475/276

(58) Field of Classification Search
USPC .......................................... 475/276
See application file for complete search history.

(56) References Cited

U.S. PATENT DOCUMENTS

| | | | | |
|---|---|---|---|---|
| 7,070,532 | B2 * | 7/2006 | Stevenson et al. | 475/116 |
| 7,392,890 | B2 * | 7/2008 | Agner | 192/48.8 |
| 8,002,663 | B2 * | 8/2011 | Nishida et al. | 475/284 |
| 8,297,422 | B2 * | 10/2012 | Arnold et al. | 192/48.603 |
| 8,365,893 | B2 * | 2/2013 | Carey et al. | 192/48.603 |
| 8,496,558 | B2 * | 7/2013 | Wittkopp et al. | 475/276 |

* cited by examiner

Primary Examiner — Dirk Wright

(57) ABSTRACT

A vehicle transmission includes an input member, an output member, a plurality of gear sets, first and second clutches, first and second actuators, and first and second bearings. The plurality of gear sets is disposed between the input member and the output member. The first and second clutches are selectively engaged to rotationally couple first and second pairs of the plurality of gear sets. The first and second actuators each have a stationary cylinder bore and a piston disposed in the stationary cylinder bore, where the pistons are substantially rotationally stationary. The first bearing is disposed between the first clutch and the nonrotating piston of the first actuator and the second bearing is disposed between the second clutch and the nonrotating piston of the second actuator.

20 Claims, 3 Drawing Sheets

| GEAR STATE | GEAR RATIO | RATIO STEP | CLUTCHING ELEMENTS ||||||
|---|---|---|---|---|---|---|---|---|
| | | | 30 | 32 | 34 | 36 | 26 | 28 |
| REV | -4.803 | | X | | | X | | |
| N | | -0.93 | | | | O | | |
| 1ST | 5.186 | | | X | | X | | |
| 2ND | 3.189 | 1.63 | | | | X | | X |
| 3RD | 2.348 | 1.36 | | X | | | | X |
| 4TH | 1.652 | 1.42 | | | X | | | X |
| 5TH | 1.252 | 1.32 | X | | | | | X |
| 6TH | 1.000 | 1.25 | | | | | X | X |
| 7TH | 0.822 | 1.22 | X | | | | X | |
| 8TH | 0.702 | 1.17 | | | X | | X | |
| 9TH | 0.618 | 1.14 | | X | | | X | |

X = ON - ENGAGED CARRYING TORQUE
O = ON - ENGAGED NOT CARRYING TORQUE

TRANSMISSION WITH DUAL CLUTCH ACTUATION ASSEMBLY

CROSS-REFERENCE TO RELATED APPLICATIONS

This application claims the benefit of U.S. Provisional Application No. 61/529,800 filed on Aug. 31, 2011. The disclosure of the above application is incorporated herein by reference.

TECHNICAL FIELD

The present disclosure relates to transmissions, and more particularly to transmissions having clutch actuation assemblies with multiple hydraulic pistons.

BACKGROUND

The statements in this section merely provide background information related to the present disclosure and may or may not constitute prior art.

Automatic transmissions provide a plurality of forward and reverse speeds or gear ratios by selectively actuating one or more brakes or clutches. A concentric slave cylinder assembly having concentric piston rings is often used to actuate two clutches that are located near each other, such as in a dual clutch transmission have two input shafts that each provide a subset of the available gear ratios. Each of the two input shafts is selectively coupled to an engine by use of one of these clutches. The radial stacking of the pistons results in a high linear speed of the outer actuator piston. To accommodate the high linear speed of the outer piston, bearings having high losses and rotating pistons are often used in the concentric slave cylinder assembly. The rotating seals used to accommodate rotating pistons have unfavorable fluid leakage characteristics and the high loss bearings contribute to in higher spin losses in the transmission. Thus, there is a need for a new and improved clutch actuation assembly that has improved bearing loss and fluid leakage characteristics.

SUMMARY

A vehicle transmission includes an input member, an output member, a plurality of gear sets, first and second clutches, first and second actuators, and first and second bearings. The plurality of gear sets is disposed between the input member and the output member. The first and second clutches are selectively engaged to rotationally couple first and second pairs of the plurality of gear sets. The first and second actuators each have a stationary cylinder bore and a piston disposed in the stationary cylinder bore, where the pistons are substantially rotationally stationary. The first bearing is disposed between the first clutch and the nonrotating piston of the first actuator and the second bearing is disposed between the second clutch and the nonrotating piston of the second actuator.

In another aspect of the present invention, the first actuator and the second actuator are axially separated and at least partially aligned in a radial direction.

In yet another aspect of the present invention, a diameter of the nonrotating piston of the first actuator is substantially the same as a diameter of the nonrotating piston of the second actuator.

In yet another aspect of the present invention, the plurality of gear sets includes four planetary gear sets.

In yet another aspect of the present invention, the vehicle transmission further includes first, second, third, and fourth brakes.

In yet another aspect of the present invention, the vehicle transmission further includes an interconnecting member continuously connecting a first rotary member and a seventh rotary member. The plurality of gear sets further includes first, second, third, and fourth planetary gear sets. The first and a second planetary gear set each have a first, a second, and a third member. Each of the first, second, and third members is included in one of the first rotary member, a second rotary member, a third rotary member, and a fourth rotary member, and two of the members of the first planetary gear set are directly separately connected with two of the members of the second planetary gear set to form the first and the second rotary members and the fourth rotary member is directly connected to the input member. The third and a fourth planetary gear set each have a first, a second, and a third member. Each of the first, second, and third members is included in one of a fifth rotary member, a sixth rotary member, the seventh rotary member, and an eighth rotary member. Two of the members of the third planetary gear set are directly separately connected with two of the members of the fourth planetary gear set to form the fifth and sixth rotary members and the sixth rotary member is directly connected to the output member.

In yet another aspect of the present invention, the first clutch is selectively engageable to connect the fourth rotary member with the fifth rotary member.

In yet another aspect of the present invention, the second clutch is selectively engageable to connect the fourth rotary member with the eighth rotary member.

In yet another aspect of the present invention, the first brake is selectively engageable to connect the third rotary member with a stationary member.

In yet another aspect of the present invention, the second brake is selectively engageable to connect the second rotary member with the stationary member.

In yet another aspect of the present invention, the third brake is selectively engageable to connect the first rotary member, the interconnecting member, and the seventh rotary member with the stationary member.

In yet another aspect of the present invention, the fourth brake is selectively engageable to connect the fifth rotary member with the stationary member.

In yet another aspect of the present invention, the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member.

In yet another aspect of the present invention, the first members of the first, second, third, and fourth planetary gear sets are sun gears, the second member of the first planetary gear set and the second member of the second planetary gear set are combined to form a single ring gear, the second member of the third planetary gear set and the third member of the fourth planetary gear set are ring gears, the third member of the first planetary gear set and the third member of the second planetary gear set are combined to form a single carrier member, and the third member of the third planetary gear set and the second member of the fourth planetary gear set are carrier members.

A clutch actuation assembly includes a first piston assembly and a second piston assembly. The first piston assembly includes a piston, an apply member, and a bearing. The second piston assembly includes a piston, an apply member, and a bearing. The piston of the first piston assembly is axially separated from and at least partially aligned with the piston of the second piston assembly in a radial direction.

In another aspect of the present invention, the bearing members are disposed between the respective apply member and piston of the first and second piston assemblies at an inner radial portion of the piston members.

In yet another aspect of the present invention, the apply members are rotationally coupled with and axially translatable through a hub of the first and second clutches.

In another embodiment of the present invention, a transmission having four planetary gear sets representable by a first lever and a second lever each having four nodes is provided. The transmission includes a first clutch and a second clutch each selectively connectable between an input member and a node of the second lever. The transmission includes a clutch actuation assembly to actuate the first and second clutches. The clutch actuation assembly includes a first piston assembly and a second piston assembly. The first piston assembly includes a piston, an apply member, and a bearing. The second piston assembly includes a piston, an apply member, and a bearing. The piston of the first piston assembly is axially separated from and at least partially aligned with the piston of the second piston assembly in a radial direction.

In another embodiment of the present invention, a transmission having and input and first, second, third, and fourth planetary gear sets each having a sun gear, a carrier member, and a ring gear is provided. The transmission includes a first clutch selectively engageable to rotationally couple the input member with the carrier member of the third planetary gear set and a second clutch selectively engageable to rotationally couple the input member with the sun gear of the fourth planetary gear set. The clutch actuation assembly includes a first piston assembly and a second piston assembly. The first piston assembly includes a piston, an apply member, and a bearing. The second piston assembly includes a piston, an apply member, and a bearing. The piston of the first piston assembly is axially separated from and at least partially aligned with the piston of the second piston assembly in a radial direction.

Further features, aspects, and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1A:
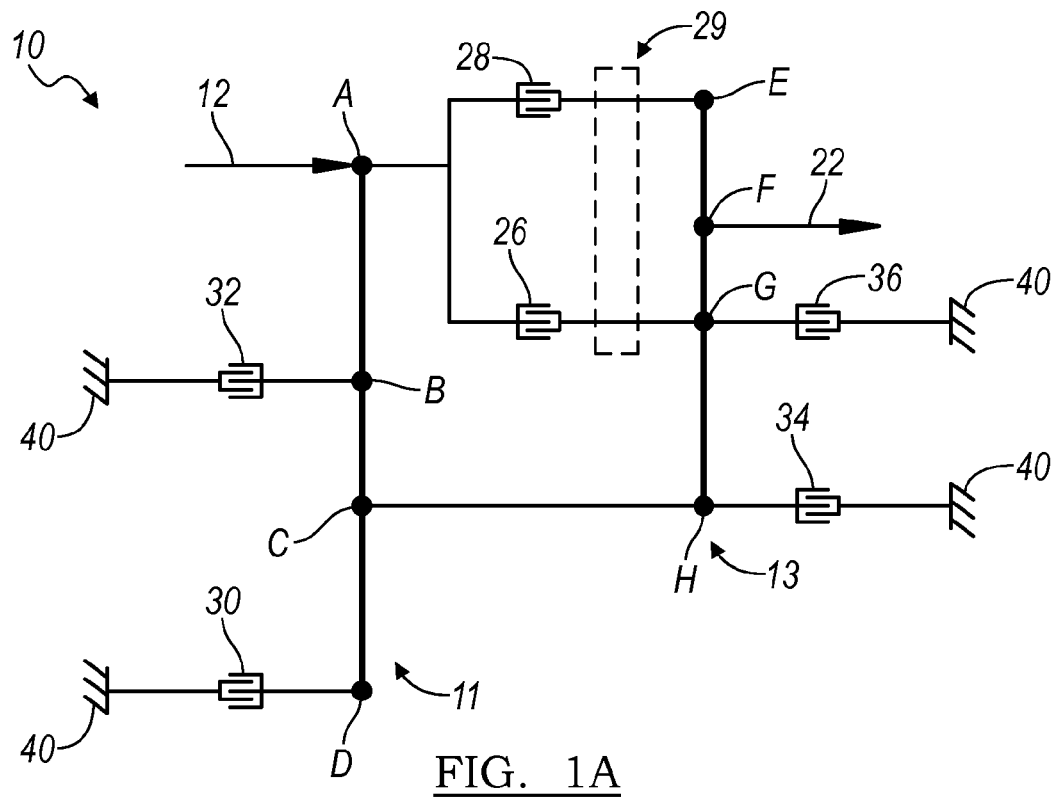
FIG. 1A is a lever diagram of a vehicle transmission including a clutch actuation assembly according to an embodiment of the present invention.

Referring now to FIG. 1A, an embodiment of a nine speed transmission 10 is illustrated in a lever diagram format. A lever diagram is a schematic representation of the components of a mechanical device such as an automatic transmission. Each individual lever with three nodes represents a planetary gear set wherein the three basic mechanical components of the planetary gear set are each represented by a node. Therefore, the three nodes of a three node lever each represent one of a sun gear, a planet gear carrier, and a ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Furthermore, multiple gear sets sharing common connections may be combined into a lever having more nodes. For example, two three-node gear sets that share two common connections may be combined into a single four node lever. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12 and a first lever 11 that represents a combination of a first planetary gear set and a second planetary gear set. Thus, two fixed connections are present between the components of the first and second planetary gear set. The first lever 11 includes a first node A, a second node B, a third node C, and a fourth node D. A second lever 13 represents a combination of a third planetary gear set and a fourth planetary gear set. Thus, two fixed connections are present between the components of the third and fourth planetary gear set. The second lever 13 includes a first node E, a second node F, a third node G, and a fourth node H. The first node A of the first lever 11 is connected for common rotation with the input shaft or member 12. The second node F of the second lever 13 is connected for common rotation with an output shaft or member 22. The third node C of the first lever 11 is connected for common rotation with the fourth node H of the second lever 13.

A first clutch 26 selectively connects the first node A of the first lever 11 with the third node G of the second lever 13. A second clutch 28 selectively connects the first node A of the first lever 11 with the first node E of the second lever 13. The first and second clutches 26, 28 are actuated by a dual clutch actuation assembly 29, as will be described below.

A first brake 30 selectively connects the fourth node D of the first lever 11 to a stationary member or a transmission housing 40. A second brake 32 selectively connects the second node B of the first lever 11 to the stationary member or transmission housing 40. A third brake 34 selectively connects the third node C of the first lever 11 and the fourth node H of the second lever 13 to the stationary member or transmission housing 40. A fourth brake 36 selectively connects the third node G of the second lever 13 to the stationary member or transmission housing 40. In the example provided the clutches 26, 28 and brakes 30, 32, 34, 36 are friction clutches each having first friction members interleaved with second friction members. It should be appreciated that other torque transmitting mechanisms, such as dog clutches, selectable one-way clutches, and bands may be incorporated without departing from the scope of the present invention.

Figure 1B:
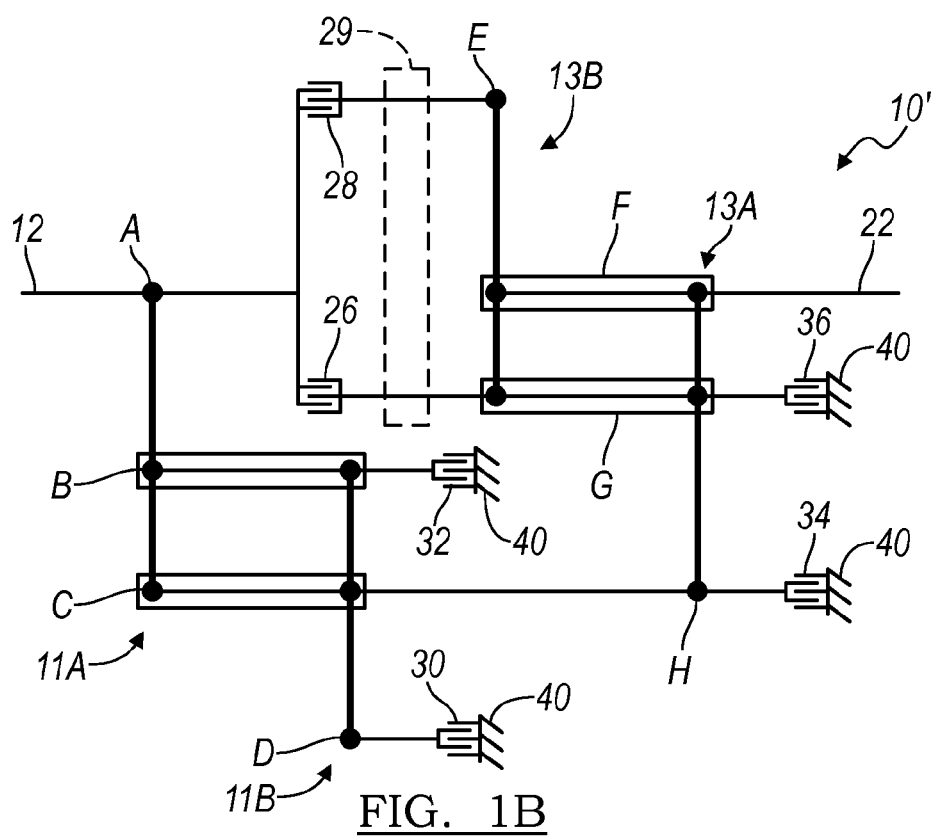
FIG. 1B is a lever diagram of a vehicle transmission including a clutch actuation assembly according to an embodiment of the present invention.

Referring now to FIGS. 1A and 1B, wherein like numbers refer to like components, a transmission 10' is represented by an example of a three node lever diagram that corresponds to the four node diagram of FIG. 1A. The lever diagram of the transmission 10' has four levers each with three nodes. Each of the three node levers represents a planetary gear set having a sun gear, a ring gear, and a planetary gear carrier. In the example provided, a first gear set 11A and a second gear set 11B have two continuous connections between each other so that they can be represented by the first lever 11 of FIG. 1A. A third gear set 13A and a fourth gear set 13B have two continuous connections between each other so that they can be represented by the second lever 13 of FIG. 1A.

Figures 2, 3:
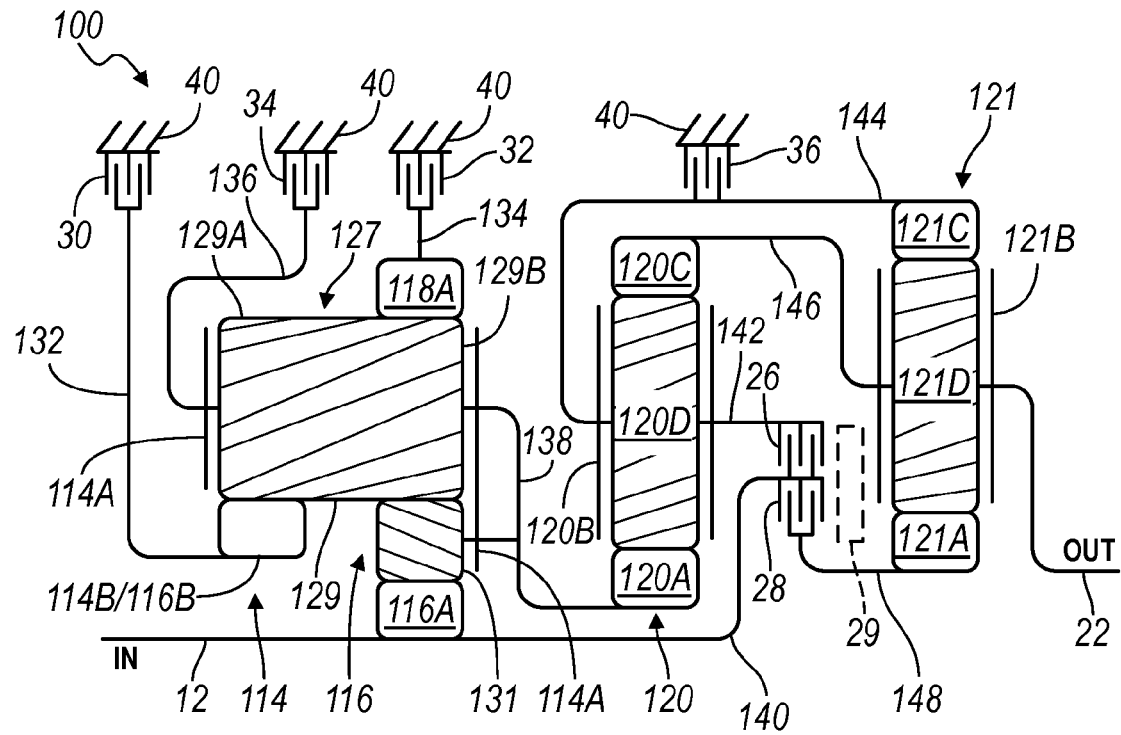
FIG. 2 is a schematic diagram of an embodiment of a vehicle transmission including a clutch actuation assembly in accordance with an embodiment of the present invention.
FIG. 3 is a truth table presenting the state of engagement of the various torque transmitting elements in each of the available forward and reverse speeds or gear ratios of the transmission illustrated in FIG. 2.

Referring now to FIG. 2, a stick diagram presents a schematic layout of an embodiment of a nine speed transmission 100 according to the present invention. More specifically, the schematic diagram of FIG. 2 is an example of a planetary gear set configuration according to the four node lever diagram describing the transmission 10 of FIG. 1 and like numbers refer to like components. The clutches, brakes, and couplings are correspondingly presented whereas the nodes of the levers 11, 13 are now represented by components of planetary gear sets such as sun gears, ring gears, planet gears and planet gear carriers. For example, the first lever 11 of FIG. 1 is now represented by a first planetary gear set 114 and a second planetary gear set 116 that are combined to form a planetary gear set assembly 127. The second lever 13 is now represented by interconnected planetary gear sets 120, 121. Planetary gear set assembly 127 includes sun gear members 114B/116B and 116A, a ring gear member 118A, and a planet gear carrier member 114A that rotatably supports a first set of planet gears 129 (only one of which is shown) and a second set of planet gears 131 (only one of which is shown). The planet gears 129 are long pinion gears that have a first end 129a and a second end 129b. The planet gears 129 are each configured to intermesh with both the sun gear member 114B/116B at the first end 129a and intermesh with the ring gear member 118A and the second set of planet gears 131 at the second end 129b. The second set of planet gears 131 are each configured to intermesh with both the sun gear member 116A and the first set of planet gears 129. The sun gear member 114B/116B is coupled to an interconnecting member or shaft 132. The ring gear member 118A is coupled to an interconnecting member of shaft 134. The planet carrier member 114A is coupled to an interconnecting member or shaft 136 and an interconnecting member or shaft 138. Sun gear member 116A is connected for common rotation with the input shaft 12 and an interconnecting member or shaft 140.

Planetary gear set 120 includes a sun gear member 120A, a ring gear member 120C, and a planet gear carrier member 120B that rotatably supports a plurality of planet gears 120D (only one of which is shown). The sun gear member 120A is connected for common rotation with the interconnecting member 138. The carrier member 120B is connected for common rotation with an interconnecting member or shaft 142 and an interconnecting member or shaft 144. The ring gear member 120C is connected for common rotation with an interconnecting member or shaft 146. The planet gears 120D are each intermeshed with both the sun gear member 120A and the ring gear member 120C.

Planetary gear set 121 includes a sun gear member 121A, a ring gear member 121C, and a planet gear carrier member 121B that rotatably supports a plurality of planet gears 121D (only one of which is shown). The sun gear member 121A is connected for common rotation with an interconnecting member or shaft 148. The carrier member 121B is connected for common rotation with the interconnecting member 146 and the output shaft 22. The ring gear member 121C is connected for common rotation with the interconnecting member 144. The planet gears 121D are each intermeshed with both the sun gear member 121A and the ring gear member 121C.

The first clutch 26 selectively connects the interconnecting member 140 with the interconnecting member 142. The second clutch 28 selectively connects the interconnecting member 140 with the interconnecting member 148. The first brake 30 selectively connects the interconnecting member 132 to the housing 40 in order to restrict rotation of the member 132. The second brake 32 selectively connects the interconnecting member 134 to the housing 40 in order to restrict rotation of the member 134. The third brake 34 selectively connects the interconnecting member 136 with the housing 40 in order to restrict rotation of the member 136. The fourth brake 36 selectively connects the interconnecting member 144 with the housing 40 in order to restrict rotation of the member 144.

Referring now to FIG. 3, a truth table presenting the various combinations of torque transmitting mechanisms that are activated or engaged to achieve the various gear states of transmission 100 is shown. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 3. Of course, other gear ratios are achievable depending on the gear diameter, gear teeth count and gear configuration selected.

Figure 4:
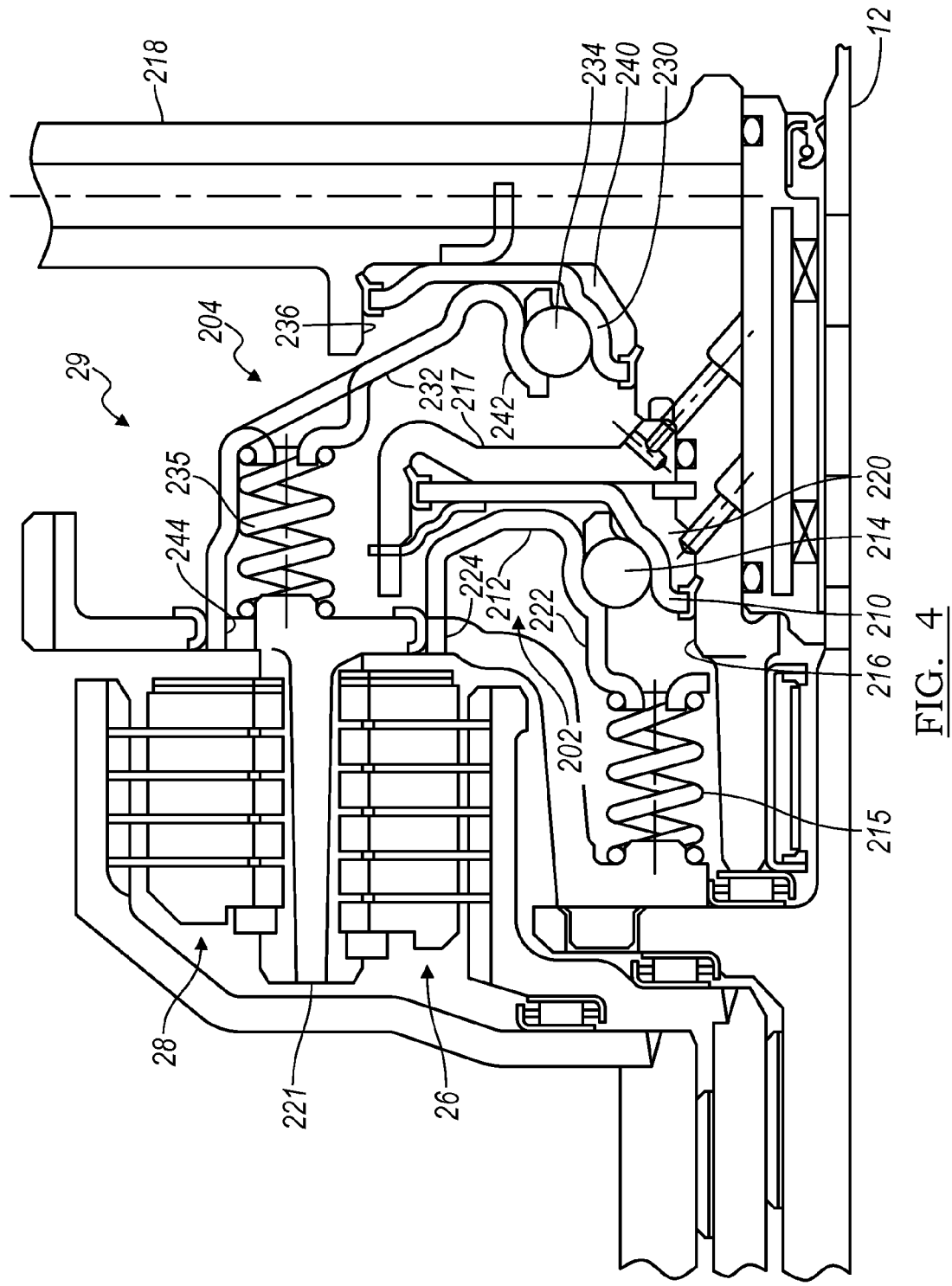
FIG. 4 is a cross-section view of a clutch actuation assembly in accordance with an embodiment of the present invention.

Referring now to FIG. 4, wherein like reference numbers refer to like components, a cross sectional view of the dual clutch actuator assembly 29 is shown in the transmission 100. It should be appreciated that the clutch actuator assembly 29 may be incorporated in other transmissions without departing from the scope of the present invention. The clutch actuator assembly 29 includes a first piston assembly 202 and a second piston assembly 204 for actuating the first and second clutches 26, 28. The first piston assembly 202 is axially separated from and at least partially aligned with the second piston assembly 204 in a radial direction.

The first piston assembly 202 includes a piston 210, an apply member 212, a bearing 214, a spring 215, and a cylinder 216. The piston 210 is disposed in the cylinder 216 formed in a separating member 217 connected to a stationary housing member 218. The separating member 217 projects radially outward from the housing member 218 near an axial midpoint of the housing member 218. The piston 210 seals against the cylinder 216 and forms a hydraulic chamber 220 in combination with the separating member 217 for actuation of the first piston assembly 202. The apply member 212 rotates with a hub 221 of the clutches 26, 28 that is rotationally coupled with the input member 12. The apply member 212 includes a first end 222 adjacent the piston 210 and a second end 224 adjacent the first clutch 26. The second end 224 slides axially through an opening in the hub 221 to compress or release the clutch 26. The bearing 214 is disposed between the first end 222 of the apply member 212 and an inner radial portion of the piston 210 to allow relative rotation between the stationary piston 210 and the rotating apply member 212. The spring 215 is disposed between the apply member 212 and the hub 221 to bias the apply member 212 away from the clutch 26.

The second piston assembly 204 includes a piston 230, an apply member 232, a bearing 234, a spring 235, and a cylinder 236. The piston 230 opposes a back side of the separating member 217 and the piston 230 is substantially aligned with the piston 210 along a radial direction from an axis of the transmission 100. Additionally, the bearing 234 is disposed at a radial distance from the axis of the transmission that is substantially similar to that of the bearing 214. The piston 230 is disposed in the cylinder 236 that is formed in the stationary housing member 218. The piston 230 seals against the cylinder 236 and forms a hydraulic chamber 240 in combination with the housing member 218 for actuation of the second piston assembly 204. The apply member 232 rotates with the hub 221 of the clutches 26, 28 and includes a first end 242 adjacent the piston 230 and a second end 244 adjacent the second clutch 28. The second end 244 slides axially through an opening in the hub 221 to compress or release the clutch 28. The bearing 234 is disposed between the first end 242 of the apply member 232 and an inner radial portion of the piston 230 to allow relative rotation between the stationary piston 230 and the rotating apply member 232. In the example provided, the bearing 234 is a low loss thrust ball type bearing. The spring 235 is disposed between the apply member 232 and the hub 221 to bias the apply member 232 away from the clutch 28.

Because the second piston assembly 204 is axially separated from the first piston assembly 202, the piston 230 has a large cross section without interfering with the piston 210 to allow reduced pressure requirements for a given torque requirement of the clutch 28. Additionally, the bearing 234 is disposed relatively close to an axis of rotation of the transmission 100. Accordingly, the linear speed difference between the apply member 232 and the piston 230 is reduced relative to radially stacked concentric slave cylinders, and therefore the piston 210 may remain non-rotating and may include non-rotating seals to provide favorable hydraulic fluid leakage characteristics from the chamber 240.

Referring now to FIGS. 2 and 4, the operation of the clutch actuation assembly 29 will be described. When actuation of the first clutch 26 is desired, a pressurized hydraulic fluid is directed to the chamber 220. The hydraulic fluid presses the piston 210 away from a base of the cylinder 216. The piston 210 presses the first end 222 of the apply member 212 through the bearing 214. The second end 224 of the apply member 212 compresses the first clutch 26 to rotationally couple the hub 221 and input member 12 to the carrier member of the planetary gear set 120. To release the clutch 26 and allow rotation between the input member 12 and the carrier member of the planetary gear set 120, the hydraulic fluid is evacuated from the chamber 220 and the spring 215 presses the apply member 212 and the piston 210 away from the clutch 26.

When actuation of the second clutch 28 is desired, a pressurized hydraulic fluid is directed to the chamber 240. The hydraulic fluid presses the piston 230 away from a base of the cylinder 236. The piston 230 presses the first end 242 of the apply member 232 through the bearing 234. The second end 244 of the apply member 232 compresses the second clutch 28 to rotationally couple the hub 221 and input member 12 to the sun gear of the planetary gear set 121. To release the clutch 28 and allow rotation between the input member 12 and the sun gear of the planetary gear set 121, the hydraulic fluid is evacuated from the chamber 240 and the spring 235 presses the apply member 232 and the piston 230 away from the clutch 28.

The present invention provides several beneficial attributes. For example, the assembly provides beneficial spin loss characteristics and a low loss bearing is incorporated due to the low linear speed of the outer bearing. Additionally, the stationary pistons employ non-rotating seals to provide favorable oil leakage characteristics and hydraulic pressure requirements.

The description of the invention is merely exemplary in nature and variations that do not depart from the general essence of the invention are intended to be within the scope of the invention. Such variations are not to be regarded as a departure from the spirit and scope of the invention.

What is claimed is:

1. A vehicle transmission comprising:
   an input member;
   an output member;
   a plurality of gear sets disposed between the input member and the output member;
   a first clutch selectively engaged to rotationally couple a first set of the plurality of gear sets;
   a first actuator having a first stationary cylinder bore and a first nonrotating piston disposed in the first stationary cylinder bore, wherein the first piston is substantially rotationally stationary;
   a first bearing disposed between the first clutch and the first nonrotating piston of the first actuator;
   a second clutch selectively engaged to rotationally couple a second set of the plurality of gear sets;
   a second actuator having a first stationary cylinder bore and a second nonrotating piston disposed in the stationary cylinder bore, wherein the second piston is substantially rotationally stationary; and
   a second bearing disposed between the second clutch and the second nonrotating piston of the second actuator,
   wherein the first piston has a first diameter substantially the same as a second diameter of the second piston.

2. The vehicle transmission of claim 1 wherein the first actuator and the second actuator are axially separated and at least partially aligned in a radial direction.

3. The vehicle transmission of claim 1 wherein the plurality of gear sets includes four planetary gear sets.

4. The vehicle transmission of claim 1 further including first, second, third, and fourth brakes.

5. The vehicle transmission of claim 4 further including an interconnecting member continuously connecting a first rotary member and a seventh rotary member, and wherein the plurality of gear sets further includes:
   first and a second planetary gear set each having a first, a second, and a third member, wherein each of the first, second, and third members is included in one of the first rotary member, a second rotary member, a third rotary member, and a fourth rotary member, and wherein two of the members of the first planetary gear set are directly separately connected with two of the members of the second planetary gear set to form the first and the second rotary members and wherein the fourth rotary member is directly connected to the input member;
   a third and a fourth planetary gear set each having a first, a second, and a third member, wherein each of the first, second, and third members is included in one of a fifth rotary member, a sixth rotary member, the seventh rotary member, and an eighth rotary member, and wherein two of the members of the third planetary gear set are directly separately connected with two of the members of the fourth planetary gear set to form the fifth and sixth rotary members and wherein the sixth rotary member is directly connected to the output member.

6. The transmission of claim 5 wherein the first clutch is selectively engageable to connect the fourth rotary member with the fifth rotary member.

7. The transmission of claim 6 wherein the second clutch is selectively engageable to connect the fourth rotary member with the eighth rotary member.

8. The transmission of claim 7 wherein the first brake is selectively engageable to connect the third rotary member with a stationary member.

9. The transmission of claim 8 wherein the second brake is selectively engageable to connect the second rotary member with the stationary member.

10. The transmission of claim 9 wherein the third brake is selectively engageable to connect the first rotary member, the interconnecting member, and the seventh rotary member with the stationary member.

11. The transmission of claim 10 wherein the fourth brake is selectively engageable to connect the fifth rotary member with the stationary member.

12. The transmission of claim 11 wherein the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member.

13. The transmission of claim 12 wherein the first members of the first, second, third, and fourth planetary gear sets are sun gears, the second member of the first planetary gear set and the second member of the second planetary gear set are combined to form a single ring gear, the second member of the third planetary gear set and the third member of the fourth planetary gear set are ring gears, the third member of the first planetary gear set and the third member of the second planetary gear set are combined to form a single carrier member, and the third member of the third planetary gear set and the second member of the fourth planetary gear set are carrier members.

14. A vehicle transmission comprising:
an input member;
an output member;
first and a second planetary gear set each having a first, a second, and a third member, wherein each of the first, second, and third members is included in one of a first rotary member, a second rotary member, a third rotary member, and a fourth rotary member, and wherein two of the members of the first planetary gear set are directly separately connected with two of the members of the second planetary gear set to form the first and the second rotary members and wherein the fourth rotary member is directly connected to the input member;
a third and a fourth planetary gear set each having a first, a second, and a third member, wherein each of the first, second, and third members is included in one of a fifth rotary member, a sixth rotary member, a seventh rotary member, and an eighth rotary member, and wherein two of the members of the third planetary gear set are directly separately connected with two of the members of the fourth planetary gear set to form the fifth and sixth rotary members and wherein the sixth rotary member is directly connected to the output member;
an interconnecting member continuously connecting the first rotary member and the seventh rotary member
a first clutch selectively engageable to connect the fourth rotary member with the fifth rotary member;
a first actuator having a first stationary cylinder bore and a first piston disposed in the first stationary cylinder bore, wherein the first piston is substantially rotationally stationary;
a first bearing disposed between the first clutch and the first nonrotating piston of the first actuator;
a second clutch axially separated from the first clutch and selectively engageable to connect the fourth rotary member with the eighth rotary member;
a second actuator having a second stationary cylinder bore and a second nonrotating piston disposed in the second stationary cylinder bore, wherein the second piston is substantially rotationally stationary and at least partially aligned with the first piston of the first actuator in a radial direction;
a second bearing disposed between the second clutch and the second nonrotating piston of the second actuator;
a first brake selectively engageable to connect the third rotary member with a stationary member;
a second brake selectively engageable to connect the second rotary member with the stationary member;
a third brake selectively engageable to connect the first rotary member, the interconnecting member, and the seventh rotary member with the stationary member; and
a fourth brake selectively engageable to connect the fifth rotary member with the stationary member, and
wherein the clutches and brakes are selectively engageable in combinations of at least two to establish at least nine forward speed ratios and at least one reverse speed ratio between the input member and the output member.

15. The vehicle transmission of claim 14 wherein a diameter of the first nonrotating piston of the first actuator is substantially the same as a diameter of the second nonrotating piston of the second actuator.

16. The transmission of claim 14 wherein the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member.

17. The transmission of claim 16 wherein the first members of the first, second, third, and fourth planetary gear sets are sun gears, the second member of the first planetary gear set and the second member of the second planetary gear set are combined to form a single ring gear, the second member of the third planetary gear set and the third member of the fourth planetary gear set are ring gears, the third member of the first planetary gear set and the third member of the second planetary gear set are combined to form a single carrier member, and the third member of the third planetary gear set and the second member of the fourth planetary gear set are carrier members.

18. A vehicle transmission comprising:
an input member;
an output member;
first and a second planetary gear set each having a first, a second, and a third member, wherein each of the first, second, and third members is included in one of a first rotary member, a second rotary member, a third rotary member, and a fourth rotary member, and wherein two of the members of the first planetary gear set are directly separately connected with two of the members of the second planetary gear set to form the first and the second rotary members and wherein the fourth rotary member is directly connected to the input member;
a third and a fourth planetary gear set each having a first, a second, and a third member, wherein each of the first, second, and third members is included in one of a fifth rotary member, a sixth rotary member, a seventh rotary member, and an eighth rotary member, and wherein two of the members of the third planetary gear set are directly separately connected with two of the members of the fourth planetary gear set to form the fifth and sixth rotary members and wherein the sixth rotary member is directly connected to the output member, and
wherein the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member;
an interconnecting member continuously connecting the first rotary member and the seventh rotary member;
a first clutch selectively engageable to connect the fourth rotary member with the fifth rotary member;
a first actuator having a first stationary cylinder bore and a first piston disposed in the first stationary cylinder bore, wherein the first piston is substantially rotationally stationary;
a first bearing disposed between the first clutch and the first nonrotating piston of the first actuator;
a second clutch axially separated from the first clutch and selectively engageable to connect the fourth rotary member with the eighth rotary member;
a second actuator having a second stationary cylinder bore and a second nonrotating piston disposed in the second stationary cylinder bore, wherein the second piston is substantially rotationally stationary and at least partially aligned with the first piston of the first actuator in a radial direction;
a second bearing disposed between the second clutch and the second nonrotating piston of the second actuator;
a first brake selectively engageable to connect the third rotary member with a stationary member;
a second brake selectively engageable to connect the second rotary member with the stationary member;
a third brake selectively engageable to connect the first rotary member, the interconnecting member, and the seventh rotary member with the stationary member; and
a fourth brake selectively engageable to connect the fifth rotary member with the stationary member, and
wherein the clutches and brakes are selectively engageable in combinations of at least two to establish at least nine forward speed ratios and at least one reverse speed ratio between the input member and the output member.

19. The vehicle transmission of claim 18 wherein a diameter of the first nonrotating piston of the first actuator is substantially the same as a diameter of the second nonrotating piston of the second actuator.

20. The transmission of claim 18 wherein the first members of the first, second, third, and fourth planetary gear sets are sun gears, the second member of the first planetary gear set and the second member of the second planetary gear set are combined to form a single ring gear, the second member of the third planetary gear set and the third member of the fourth planetary gear set are ring gears, the third member of the first planetary gear set and the third member of the second planetary gear set are combined to form a single carrier member, and the third member of the third planetary gear set and the second member of the fourth planetary gear set are carrier members.

* * * * *